United States Patent
Xie

(10) Patent No.: US 11,303,825 B2
(45) Date of Patent: Apr. 12, 2022

(54) INFORMATION PROCESSING METHOD AND ELECTRONIC APPARATUS

(71) Applicant: Lenovo (Beijing) Co., Ltd., Beijing (CN)

(72) Inventor: Jun Xie, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 17/005,022

(22) Filed: Aug. 27, 2020

(65) Prior Publication Data

US 2021/0067709 A1 Mar. 4, 2021

(30) Foreign Application Priority Data

Aug. 28, 2019 (CN) .......................... 201910802076.9

(51) Int. Cl.
*H04N 7/14* (2006.01)
*H04N 7/15* (2006.01)
*H04N 5/262* (2006.01)
*H04N 5/445* (2011.01)

(52) U.S. Cl.
CPC .......... *H04N 5/2628* (2013.01); *H04N 5/445* (2013.01); *H04N 7/142* (2013.01); *H04N 7/15* (2013.01)

(58) Field of Classification Search
USPC ...................................... 348/14.07
See application file for complete search history.

(56) References Cited

U.S. PATENT DOCUMENTS

| 2004/0185878 | A1 | 9/2004 | Woo | |
| 2011/0249073 | A1* | 10/2011 | Cranfill | G06F 3/0488 348/14.02 |
| 2017/0272659 | A1* | 9/2017 | Kim | H04N 5/272 |
| 2018/0227542 | A1* | 8/2018 | Qi | H04N 7/147 |

FOREIGN PATENT DOCUMENTS

| CN | 102215373 A | | 10/2011 |
| CN | 106973252 A | * | 7/2017 |
| CN | 106973252 A | | 7/2017 |
| CN | 109922204 A | | 6/2019 |
| JP | 5306253 B2 | | 10/2013 |

* cited by examiner

*Primary Examiner* — Amal S Zenati
(74) *Attorney, Agent, or Firm* — Anova Law Group, PLLC

(57) ABSTRACT

An information processing method includes determining an image display orientation of a first image collected by a first electronic apparatus, determining an image display orientation of a second image received by the first electronic apparatus, and adjusting the image display orientation of the second image to be consistent with the image display orientation of the first image displayed on the first electronic apparatus. The second image is collected by a second electronic apparatus.

12 Claims, 6 Drawing Sheets

---

Determine an image display orientation of a first image collected by a first electronic apparatus — S61

Determine an image display orientation of a second image, which is collected by a second electronic apparatus, obtained/received by the first electronic apparatus — S62

Determine the image display orientation of the second image to be different from the image display orientation of the first image, and notify the second electronic apparatus to collect the second image in the image display orientation of the first image so that the image display orientation of the obtained second image collected by the second electronic apparatus is consistent with the image display orientation of the first image — S63

INFORMATION PROCESSING METHOD AND ELECTRONIC APPARATUS

CROSS-REFERENCE TO RELATED APPLICATION

This application claims priority to Chinese Patent Application No. 201910802076.9, filed on Aug. 28, 2019, the entire content of which is incorporated herein by reference.

TECHNICAL FIELD

The present disclosure generally relates to the control technology field and, more particularly, to an information processing method and an electronic apparatus.

BACKGROUND

When an electronic apparatus is used for a video call, a home screen and the other party's screen may both be used for the video call. The display orientation of the home screen corresponds to an orientation of the electronic apparatus held by the local user. The display orientation of the other party's screen corresponds to an orientation of the other party's electronic apparatus. As such, the orientation of the home screen and the orientation of the other party's screen may be different, which may cause the local user to see the other party's screen in an inconvenient screen orientation.

SUMMARY

Embodiments of the present disclosure provide an information processing method. The method includes determining an image display orientation of a first image collected by a first electronic apparatus, determining an image display orientation of a second image received by the first electronic apparatus, and adjusting the image display orientation of the second image to be consistent with the image display orientation of the first image displayed on the first electronic apparatus. The second image is collected by a second electronic apparatus.

Embodiments of the present disclosure provide an electronic apparatus including a display and a processor. The display is configured to display a first image and a second image simultaneously. The processor is configured to determine an image display orientation of a first image collected by a first electronic apparatus, determine an image display orientation of a second image received by the first electronic apparatus, and adjust the image display orientation of the second image to be consistent with the image display orientation of the first image displayed on the first electronic apparatus. The second image is collected by a second electronic apparatus.

Embodiments of the present disclosure provide a storage medium. The storage medium stores instructions that, when executed by a processor, cause the processor to determine an image display orientation of a first image collected by a first electronic apparatus, determine an image display orientation of a second image received by the first electronic apparatus, and adjust the image display orientation of the second image to be consistent with the image display orientation of the first image displayed on the first electronic apparatus. The second image is collected by a second electronic apparatus.

DETAILED DESCRIPTION OF THE EMBODIMENTS

A technical solution of embodiments of the present disclosure is described in connection with accompanying drawings of embodiments of the present disclosure. Described embodiments are merely some embodiments of the present disclosure, not all the embodiments. Based on embodiments of the present disclosure, all other embodiments obtained by those of ordinary skill in the art without creative efforts are within the scope of the present disclosure.

Figure 1:
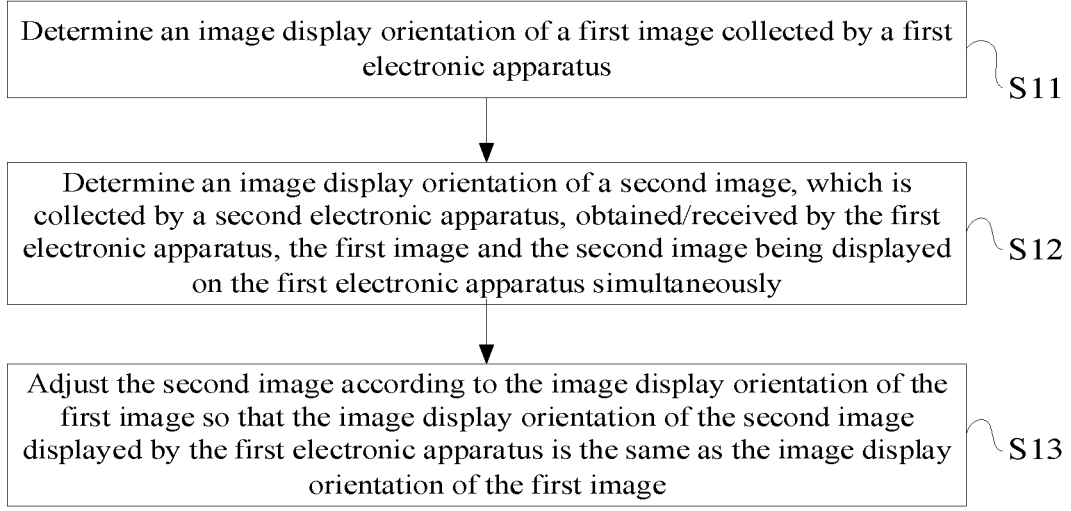
FIG. 1 illustrates a schematic flowchart of an information processing method according to some embodiments of the present disclosure.

As shown in FIG. 1, the present disclosure discloses an information processing method. The information processing method includes the following processes.

At S11, an image display orientation of a first image collected by a first electronic apparatus is determined.

When a video call or a video meeting is in progress, two electronic apparatuses may collect images within their collection ranges, respectively, and display the images collected by the two electronic apparatuses simultaneously on the two electronic apparatuses.

For example, a first apparatus may collect a first image in a collection range of the first apparatus. A second apparatus may collect a second image in a collection range of the second apparatus. The first apparatus may display the first image and the second image simultaneously. The second apparatus may also display the first image and the second image simultaneously.

Each of the electronic apparatuses may have an image collection orientation during image collection. For example, when an electronic apparatus is placed vertically, an image collection device may be at the top or at the bottom of the electronic apparatus. Thus, the image collected by the electronic apparatus may be vertical. When the electronic apparatus is placed horizontally, the image collection device of the electronic apparatus may be on the left or on the right. Thus, the image collected by the electronic apparatus may be horizontal.

Figure 2A:
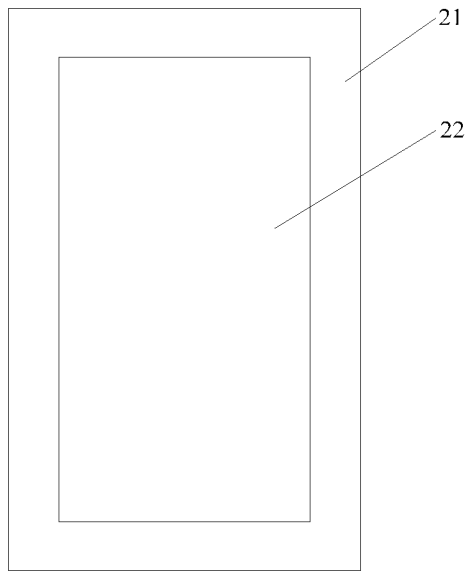
FIG. 2A illustrates a schematic diagram of a first image collected by a first apparatus in a vertical orientation according to some embodiments of the present disclosure.
Figure 2B:
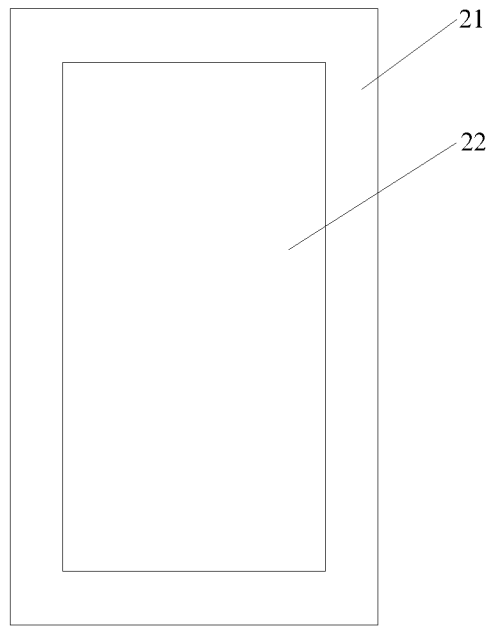
FIG. 2B illustrates a schematic diagram of the first image displayed by the first apparatus in the vertical orientation according to some embodiments of the present disclosure.
Figure 2C:
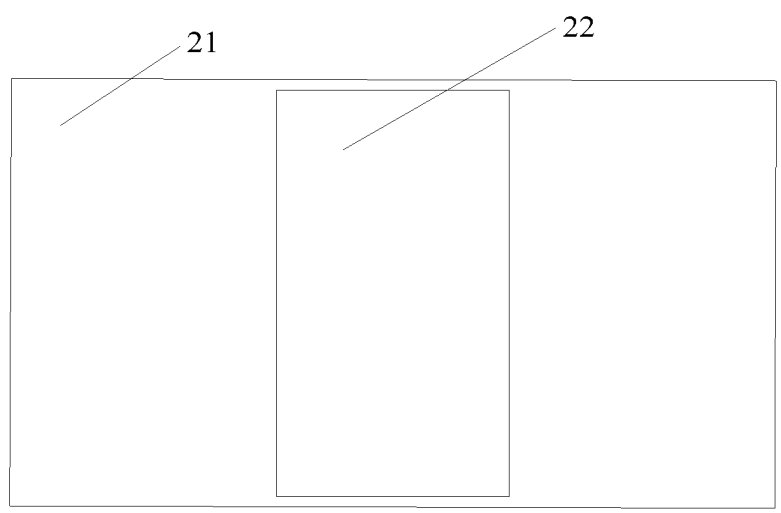
FIG. 2C illustrates a schematic diagram of the first image displayed by the first apparatus in a horizontal orientation according to some embodiments of the present disclosure.

When the image collected by the electronic apparatus is the horizontal image, no matter which orientation the electronic apparatus is placed, the image is displayed vertically. FIG. 2A illustrates a first image 22 vertically collected by a first electronic apparatus 21. FIG. 2B illustrates the first image 22 vertically displayed by the first electronic apparatus 21. FIG. 2C illustrates the first image 22 horizontally displayed by the first electronic apparatus 21.

Therefore, the image display orientation of the image collected by each of the electronic apparatuses may be the same as the image collection orientation.

At S12, an image display orientation of a second image, which is collected by a second electronic apparatus, received by the first electronic apparatus is determined. The first image and the second image may be displayed on the first electronic apparatus simultaneously.

When the first electronic apparatus needs to display the first image and the second image simultaneously, the first electronic apparatus may receive the second image collected by the second electronic apparatus. After receiving the second image, the first electronic apparatus may determine the image display orientation of the second image. Similarly, when the second electronic apparatus needs to display the first image and the second image simultaneously, the second electronic apparatus may receive the first image collected by the first electronic apparatus. After receiving the first image, the second electronic apparatus may determine the image display orientation of the first image.

At S13, the second image is adjusted according to the image display orientation of the first image to cause the image display orientation of the second image displayed by the first electronic apparatus to be the same as the image display orientation of the first image.

After determining the image display orientation of the first image and the image display orientation of the second image, the first electronic apparatus needs to determine consistency between the image display orientation of the second image received by the first electronic apparatus and the image display orientation of the first image. That is, the first electronic apparatus needs to determine whether the image display orientation of the second image is the same as the image display orientation of the first image.

If the image display orientation of the second image is consistent with the image display orientation of the first image, the first electronic apparatus may not need to adjust the image display orientation of the first image or the second image.

If the image display orientation of the second image is not consistent with the image display orientation of the first image, the first electronic apparatus may need to adjust the image display orientation of the second image on the first electronic apparatus. As such, the image display orientation of the second image may be consistent with the image display orientation of the first image. Since the image display orientation of the first image is consistent with the image collection orientation of the first electronic apparatus, the image display orientations of the second image and the first image both are consistent with the image collection orientation of the first electronic apparatus. Similarly, on the second apparatus, the image display orientation of the first image needs to be consistent with the image display orientation of the second image, such that the image display orientations of the first image and the second image are consistent with the image collection orientation of the second electronic apparatus.

Figure 3A:
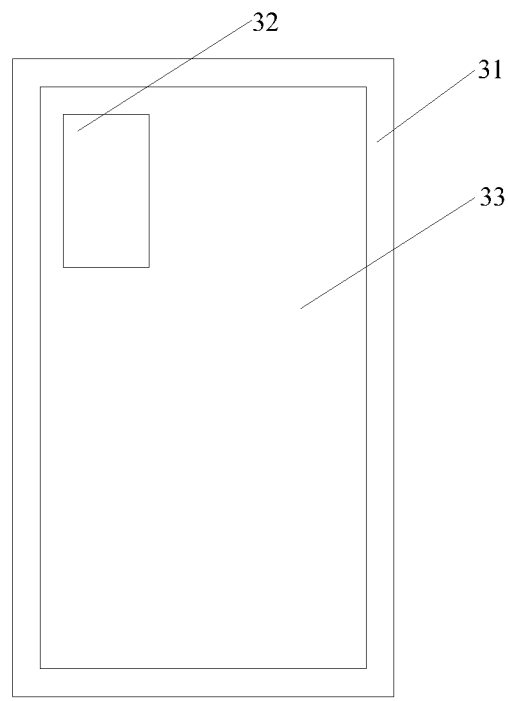
FIG. 3A illustrates a schematic diagram of two images simultaneously displayed by the first apparatus in a same display orientation according to some embodiments of the present disclosure.
Figure 3B:
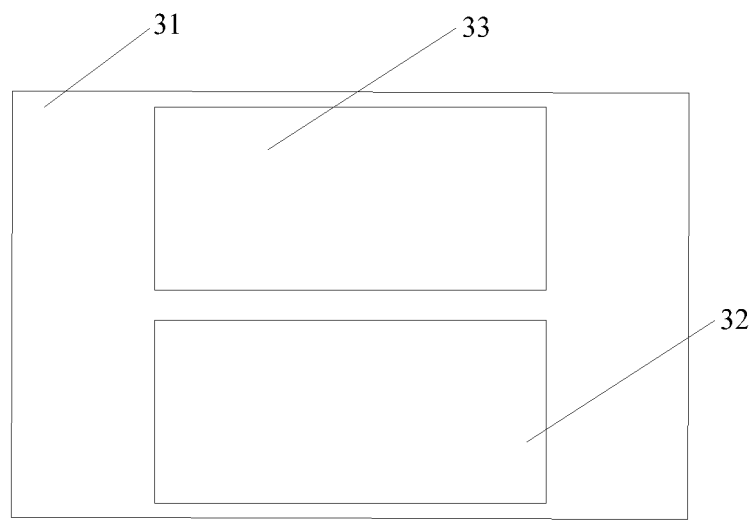
FIG. 3B illustrates a schematic diagram of the two images simultaneously displayed by the first apparatus in the same display orientation according to some embodiments of the present disclosure.

FIG. 3A illustrates a first image 32 and a second image 33 simultaneously displayed on a first electronic apparatus 31, when an image collection orientation of the first electronic apparatus 31 is the vertical orientation. If the image display orientation of the second image is not consistent with the image display orientation of the first image, the first electronic apparatus 31 may adjust the image display orientation of the second image 33. As such, the image display orientation of the second image 33 is consistent with the image display orientation of the first image 32, and both image display orientations are the vertical orientation. FIG. 3B illustrates the first image 32 and the second image 33 simultaneously displayed on a first electronic apparatus 31, when the image collection orientation of the first electronic apparatus 31 is the horizontal orientation. If the image display orientation of the second image is not consistent with the image display orientation of the first image, the first electronic apparatus 31 may adjust the image display orientation of the first image. As such, the image display orientation of the first image 32 is consistent with the image display orientation of the second image 33, and both image display orientations are the horizontal orientation.

Figure 4:
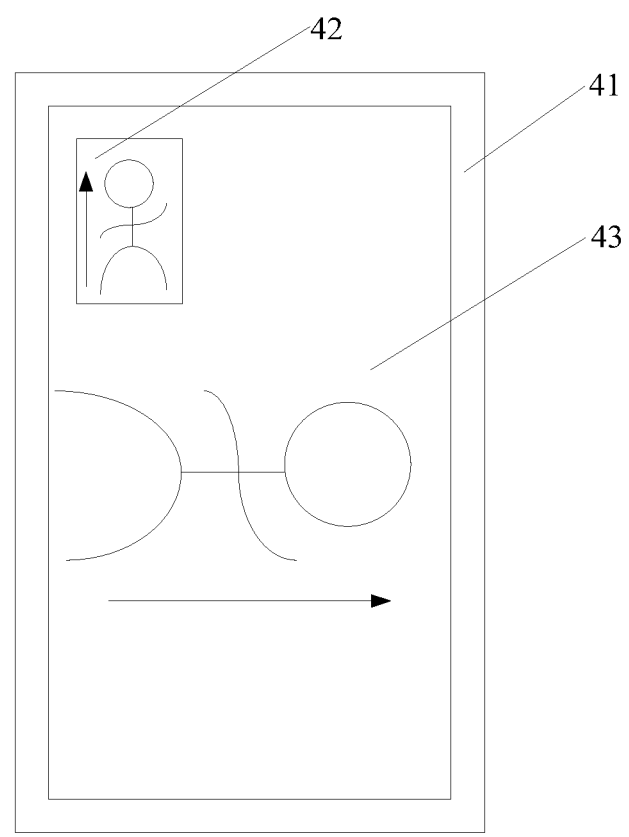
FIG. 4 illustrates a schematic diagram of a first image and a second image watched on the first electronic apparatus in different orientations according to some embodiments of the present disclosure.

By causing the image display orientation of the first image to be consistent with the image display orientation of the second image, a problem that a user may simultaneously watch the first image and the second image having the inconsistent image display orientations may be prevented. FIG. 4 illustrates a first electronic apparatus 41, a first image 42, and a second image 43. A positive direction of the first image 42 is upwards, which is consistent with the image collection orientation of the first image collected by the first electronic apparatus. A positive direction of the second image 43 is toward the right, which is the same as the image collection orientation of the second image collected by the second electronic apparatus. If a scene appears as shown in FIG. 4, the user watches the first image and the second image through the first electronic apparatus. Since the image display orientations are inconsistent, user experience is reduced. A solution of the present disclosure makes the image display orientation of the first image to be consistent with the image display orientation of the second image to prevent the situation shown in FIG. 4. The user experience of simultaneously watching the first image and the second image is improved.

In some embodiments, when a video call through the first electronic apparatus and the second electronic apparatus is in progress, each of the first electronic apparatus and the second electronic apparatus may simultaneously display both the first image and the second image. The image display orientation of the second image is consistent with the image display orientation of the first image displayed on the first electronic apparatus. The image display orientation of the first image is consistent with the image display orientation of the second image displayed on the second electronic apparatus. However, the image display orientation of the first image displayed on the first electronic apparatus may be different from the orientation of the first electronic apparatus, or the same as the orientation of the first electronic apparatus. Similarly, the image display orientation of the second image displayed on the second electronic apparatus may be different from the orientation of the second electronic apparatus, or the same as the orientation of the second electronic apparatus. The first electronic apparatus or the second electronic apparatus may be placed vertically or horizontally. The direction of the first electronic apparatus may be the same as or different from the image collection orientation of the first image. The orientation of the second electronic apparatus may be the same as or different from the image collection orientation of the second image.

When the video call is in progress, the orientation of the first electronic apparatus is consistent with the image collection orientation of the first image, and the direction of the second electronic apparatus is consistent with the image collection orientation of the second image.

The information processing method of embodiments of the present disclosure may include determining the image display orientation of the first image collected by the first electronic apparatus and determining the image display orientation of the second image, which is collected by the second electronic apparatus, obtained by the first electronic apparatus. The first image and the second image may be displayed simultaneously on the first electronic apparatus. The second image may be adjusted according to the image display orientation of the first image to cause the image display orientation of the second image to be consistent with the image display orientation of the first image displayed on the first electronic apparatus. The present solution may determine the image display orientation of the second image after the image display orientation of the first image is determined. The present solution may adjust the second image according to the image display orientation of the first image to cause the image display orientation of the first image to be consistent with the image display orientation of the second image. As such, the problem that the user watches the first image and the second image at the same time with difficult because of the inconsistent image display orientations is prevented. Thus, the user experience is improved.

Figure 5:
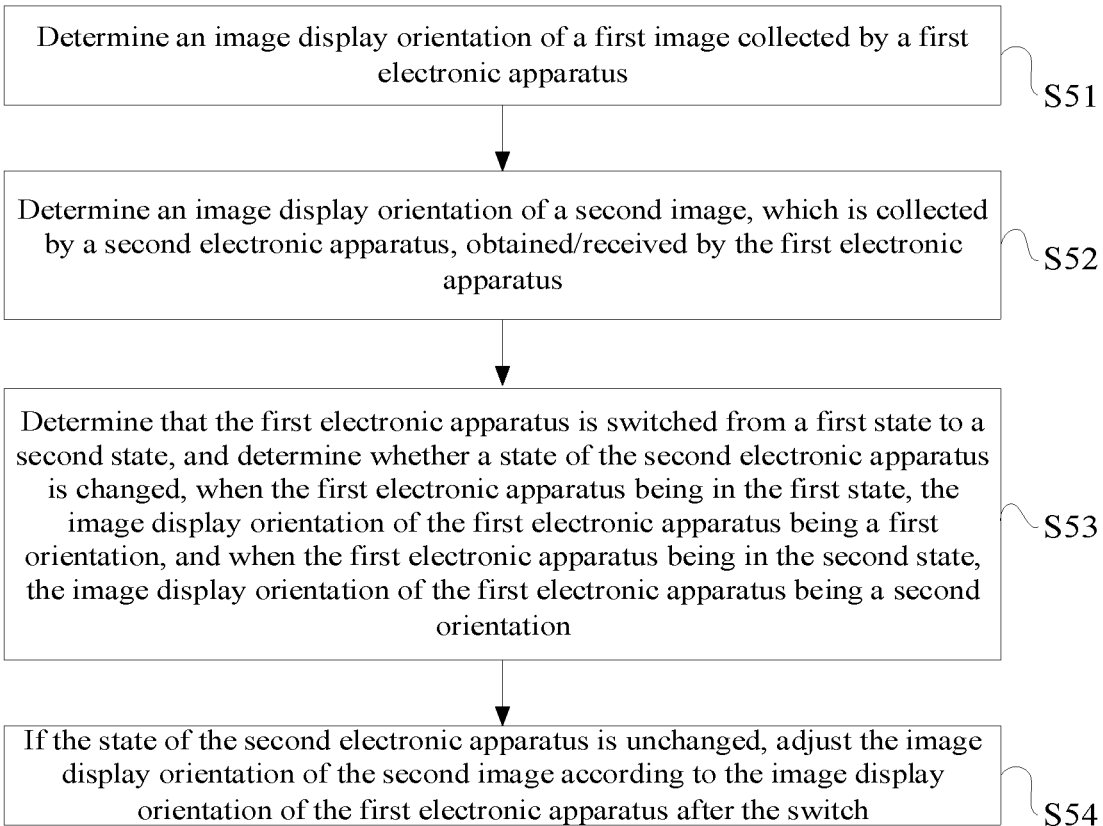
FIG. 5 illustrates a schematic flowchart of an information processing method according to some embodiments of the present disclosure.

FIG. 5 illustrates a schematic flowchart of an information processing method according to some embodiments of the present disclosure.

At S51, an image display orientation of a first image collected by a first electronic apparatus is determined.

At S52, an image display orientation of a second image, which is collected by a second electronic apparatus, received by the first electronic apparatus is determined.

At S53, whether the first electronic apparatus is switched from a first state to a second state is determined, and whether a state of the second electronic apparatus is changed is determined. When the first electronic apparatus is in the first state, the image display orientation of the first electronic apparatus is a first orientation. When the first electronic apparatus is in the second state, the image display orientation of the first electronic apparatus is a second orientation.

At S54, if the state of the second electronic apparatus is not changed, the image display orientation of the second image is adjusted according to the image display orientation of the switched first electronic apparatus.

In some embodiments, the video call is in progress through the first electronic apparatus and the second electronic apparatus. The state of the first electronic apparatus may be changed, that is the first electronic apparatus may be switched from the first state to the second state. When the first electronic apparatus is in the first state, the image display orientation of the first electronic apparatus is the first orientation. When the first electronic apparatus is in the second state, the image display orientation of the first electronic apparatus is the second orientation. That is, during the video call, when the first electronic apparatus is switched from the first state to the second state, correspondingly, the image display orientation of the first image may be switched from the first orientation to the second orientation.

The first state and the second state may be a placement orientation of an electronic apparatus. When the placement orientation of the electronic apparatus is changed, the image collection orientation of the first image may be changed. Correspondingly, the image display orientation of the first image may be changed.

When the state of the first electronic apparatus is changed, whether the state of the second electronic apparatus is changed may be determined. If the state of the second electronic apparatus is changed, and the second electronic apparatus is also switched from the first state to the second state, the image display orientation of the second image collected by the second electronic apparatus may also be switched from the first orientation to the second orientation. The image display orientation of the first image collected by the first electronic apparatus may be switched to the second orientation as the state of the first electronic apparatus is changed. The image display orientation of the second image may also be switched to the second orientation as the state of the second electronic apparatus is changed. In this case, the image display orientations of the first image and the second image simultaneously displayed on each of the first electronic apparatus and the second electronic apparatus having the changed states may still be the same, that is the second orientation. Therefore, the image display orientation of the second image displayed on the first electronic apparatus may not need to be adjusted individually. Further, the image display orientation of the first image displayed on the second electronic apparatus, may not need to be adjusted individually.

In some embodiments, the state of the first electronic apparatus may be changed, and the state of the second electronic apparatus may not be changed. In other embodiments, even the state of the second apparatus may be changed, which may not be switched from the first state to the second state but switched to another state except the second state. After the state is changed, the state of the first electronic apparatus may be the second state, and the state of the second electronic apparatus maybe another state. Thus, the image display orientation of the first image collected by the first electronic apparatus may be different from the image display orientation of the second image collected by the second electronic apparatus, or the image display orientation of the first image displayed on the first electronic apparatus may be different from the image display orientation of the second image displayed on the first electronic apparatus. In this case, the image display orientation of the second image may need to be adjusted according to the image display orientation of the first electronic apparatus after the state is switched. As such, the image display orientation of the adjusted second image may be the same as the image display orientation of the first image on the first electronic apparatus.

At this point, since the state of the second electronic apparatus is not changed, the image display orientation of the second electronic apparatus may not be changed. Thus, the image display orientation of the second image displayed on the second electronic apparatus may not be changed, and the image display orientation of the first image displayed on the second electronic apparatus may not need to be adjusted. When the video call is started, the image display orientation of the first image may be adjusted, such that the image display orientation of the adjusted first image on the second electronic apparatus is the same as the image display orientation of the second image. The second image with the image display orientation not being adjusted and the second image during the video call may still maintain the same image display direction.

Further, adjusting the image display orientation of the second image according to the image display orientation of the first electronic apparatus after the state is switched may include adjusting the image display orientation of the second image collected by the second electronic apparatus according to the image display orientation of the first electronic apparatus after the state is switched.

In some embodiments, when the first electronic apparatus is switched from the first state to the second state, the image display orientation of the first image collected by the first electronic apparatus is switched from the first orientation to the second orientation. At this point, the second electronic apparatus is notified such that the second electronic apparatus may directly adjust the image collection orientation of the second image to adjust the image collection orientation of the second electronic apparatus to the second orientation. That is, the second electronic apparatus may collect the second image in the second orientation. Thus, the image display orientation of the second image collected by the second apparatus may be the second orientation. After the second electronic apparatus transmits the second image to the first electronic apparatus, the first electronic apparatus may directly receive the second image with the image display orientation as the second orientation. The image display orientation of the second image is consistent with the image display orientation of the first image of the first electronic apparatus. That is, the image display orientation of the second image collected by the second electronic apparatus may be adjusted according to the image display orientation of the first electronic apparatus after the state is switched.

Further, adjusting the image display orientation of the second image according to the image display orientation of the first electronic apparatus after the state is switched may include cutting the second image according to the image display orientation of the second electronic apparatus after the state is switched to cause the image display orientation of the cropped second image to be consistent with the image display orientation of the first image.

In some embodiments, when the first electronic apparatus is switched from the first state to the second state, the image display orientation of the first image collected by the first electronic apparatus may be switched from the first orientation to the second orientation. At this point, the state of the second electronic apparatus may not need to be adjusted, and the image collection orientation of the second image collected by the second electronic apparatus may not need to be adjusted. The second image collected by the second electronic apparatus may be directly cropped to cause the image display orientation of the cropped second image to be the same as the image display orientation of the first image collected by the first electronic apparatus after the state is switched.

If the first electronic apparatus is switched from the vertical orientation to the horizontal orientation, the image display orientation of the first image collected by the first electronic apparatus may also be switched from the vertical orientation to the horizontal orientation. However, the image display orientation of the second image may be still the vertical orientation. In this case, blank display contents may be added on both sides of the second image in the vertical orientation, such that the second image with the added blank display contents may have a size the same as a size of the horizontal orientation. The direction of the second image is then adjusted to the horizontal orientation. If the first electronic apparatus is switched from the horizontal orientation to the vertical orientation, the image display orientation of the first image collected by the first electronic apparatus may be also switched from the horizontal orientation to the vertical orientation. However, the image display orientation of the second image may be still the horizontal orientation. In this case, the second image in a horizontal orientation may be cropped to have a size the same as a size of the vertical orientation. The direction of the cropped second image may be then adjusted to the vertical orientation.

The information processing method of embodiments of the present disclosure may include determining the image display orientation of the first image collected by the first electronic apparatus and determining the image display orientation of the second image, which is collected by the second electronic apparatus, obtained by the first electronic apparatus. The first image and the second image may be displayed simultaneously on the first electronic apparatus. The second image may be adjusted according to the image display orientation of the first image to cause the image display orientation of the second image to be consistent with the image display orientation of the first image displayed on the first electronic apparatus. The present solution may determine the image display orientation of the second image after the image display orientation of the first image is determined. The present solution may adjust the second image according to the image display orientation of the first image to cause the image display orientation of the first image to be consistent with the image display orientation of the second image. As such, the problem that the user may inconveniently watch the first image and the second image with the inconsistent image display orientations simultaneously may be prevented. Thus, the user experience may be improved.

Figure 6:
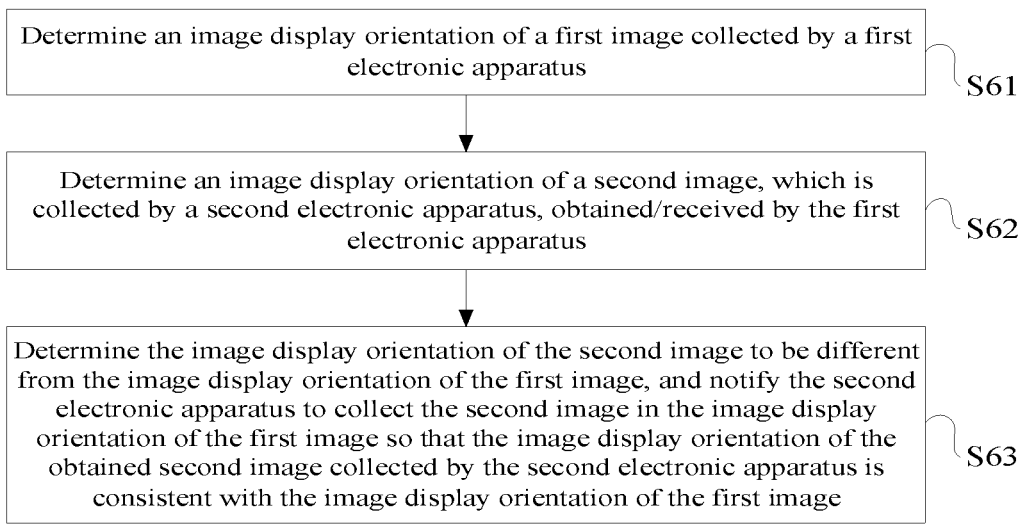
FIG. 6 illustrates a schematic flowchart of an information processing method according to some embodiments of the present disclosure.

FIG. 6 illustrates a schematic flowchart of an information processing method according to some embodiments of the present disclosure.

At S61, an image display orientation of a first image collected by a first electronic apparatus is determined.

At S62, an image display orientation of a second image collected by a second electronic apparatus, received by the first electronic apparatus, is determined.

At S63, the image display orientation of the second image is determined to be different from the image display orientation of the first image, and the second electronic apparatus is notified to collect the second image in the image display orientation of the first image. As such, the image display orientation of the received second image collected by the second electronic apparatus may be consistent with the image display orientation of the first image.

When the video call is established, if the image display orientation of the second image is determined to be different from the image display orientation of the first image, the second electronic apparatus may be notified, such that the image display orientation may be changed when the second electronic apparatus collects the second image. After the image collection orientation is changed, the image display orientation of the second image collected by the second electronic apparatus may be the same as the image display orientation of the first image collected by the first electronic apparatus. Therefore, the image display orientations of the first image and the second image displayed on the first electronic apparatus, and the image display orientations of the first image and the second image displayed on the second electronic apparatus may be ensured to be the same. The situation may not happen that the first electronic apparatus may display the first image and the second image in the first orientation, and the second electronic apparatus may display the first image and the second image in the second orientation.

Further, the state of the first electronic apparatus may be determined according to the image display orientation of the first image. The image display orientation of the first image may be the same as the state of the first electronic apparatus. The second electronic apparatus may be then notified, such that the second electronic apparatus may be adjusted to be the same state as the first electronic apparatus.

When the video call is established, if the image display orientation of the first image collected by the first electronic apparatus is different from the image display orientation of the second image collected by the second electronic apparatus, the state of the first electronic apparatus may be determined according to the image display orientation of the first image. That is, whether the first electronic apparatus is in the first state or the second state may be determined. When the first electronic apparatus is in the first state, the image display orientation of the first image collected by the first electronic apparatus may be the first orientation. When the first electronic apparatus is in the second state, the image display orientation of the first image collected by the first electronic apparatus may be the second orientation.

After the state of the first electronic apparatus is determined, the second electronic apparatus may be notified, such that the second electronic apparatus may be adjusted to be in the same state as the first electronic apparatus. That is, when the first electronic apparatus is in the first state, the second electronic apparatus is notified, such that the second electronic apparatus may be adjusted to be in the first state. As such, the image display orientation of the first image collected by the first electronic apparatus may be ensured to be the same as the image display orientation of the second image collected by the second electronic apparatus. Both image display orientations of the first image and the second image are the first orientation. If the first electronic apparatus is in the second state, the second electronic apparatus may be notified, such that the second electronic apparatus may be adjusted to be in the second state. As such, the image display orientation of the first image collected by the first electronic apparatus may be ensured to be the same as the image display orientation of the second image collected by the second electronic apparatus. Both image display orientations of the first image and the second image are the second orientation.

The information processing method of embodiments of the present disclosure includes determining the image display orientation of the first image collected by the first electronic apparatus and determining the image display orientation of the second image collected by the second electronic apparatus received by the first electronic apparatus. The first image and the second image may be displayed simultaneously on the first electronic apparatus. The second image is adjusted according to the image display orientation of the first image to cause the image display orientation of the second image to be consistent with the image display orientation of the first image displayed on the first electronic apparatus. The present solution may determine the image display orientation of the second image after the image display orientation of the first image is determined. The present solution may adjust the second image according to the image display orientation of the first image to cause the image display orientation of the first image to be consistent with the image display orientation of the second image. As such, the problem that the user watches the first image and the second image at the same time with inconvenience because of the inconsistent image display orientations is prevented. Thus, the user experience is improved.

Embodiments of the present disclosure may be used to manage the image displays collected by multiple apparatus during a video session. A first electronic apparatus, such as a smartphone or a laptop, may check the image display orientation of the first image collected by the first electronic apparatus and the display orientations of the images collected by other electronic apparatuses. Depending on the placement orientation of the other electronic apparatuses and depending on the image orientations of the images collected by the other electronic apparatuses, the first electronic apparatus may adjust the image displays of the images collected by multiple other electronic apparatuses to be consistent with the display orientation of the first image.

Embodiments of the present disclosure may be used to manage the image displays collected by multiple apparatus during a video session on a set schedule or upon a user's demand. The processes described in FIGS. 1, 5, and 6 may be executed periodically on the first electronic apparatus, or may be executed upon a user's request. For example, during a video session, a user may trigger his electronic apparatus to adjust the orientations of multiple images through one or more user input interfaces.

Figure 7:
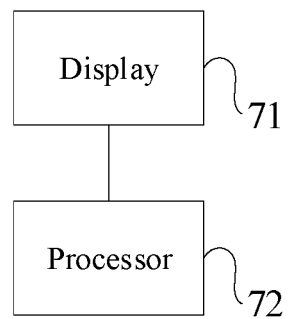
FIG. 7 illustrates a schematic structural diagram of an electronic apparatus according to some embodiments of the present disclosure.

FIG. 7 illustrates a schematic structural diagram of an electronic apparatus according to some embodiments of the present disclosure.

The electronic apparatus includes a display 71 and a processor 72.

The display 71 may be configured to display the first image and the second image simultaneously.

The processor 72 may be configured to determine the image display orientation of the first image collected by the electronic apparatus, determine the image display orientation of the second image collected by the second electronic apparatus, received by the electronic apparatus, and adjust the second image according to the image display orientation of the first image, such that the image display orientation of the second image may be consistent with the image display orientation of the first image displayed on the electronic apparatus.

For convenient description, the electronic apparatus of embodiments of the present disclosure may be referred to as the first electronic apparatus. That is, all the first electronic apparatuses in the following specification may be referred to as the electronic apparatus of embodiments of the present disclosure.

When the video call or video meeting is in progress, two electronic apparatuses may be usually used to collect images within their collection ranges. The two electronic apparatuses may also display the images collected by the two electronic apparatuses simultaneously.

For example, the first electronic apparatus may collect the first image in the collection range of the first electronic apparatus. The second electronic apparatus may collect the second image in the collection range of the second electronic apparatus. The first electronic apparatus may display the first image and the second image simultaneously. The second electronic apparatus may also display the first image and the second image simultaneously.

Each of the electronic apparatuses may have an image collection orientation during image collection. For example, when an electronic apparatus is placed vertically, an image collection device is at the top or bottom of the electronic apparatus. Thus, the image collected by the electronic apparatus is vertical. When the electronic apparatus is placed horizontally, the image collection device of the electronic apparatus us on the left or the right. Thus, the image collected by the electronic apparatus is horizontal.

When the image collected by the electronic apparatus is the horizontal image, no matter which orientation the electronic apparatus is placed, the image is displayed vertically. FIG. 2A illustrates a first image 22 vertically collected by a first electronic apparatus 21. FIG. 2B illustrates the first image 22 vertically displayed by the first electronic apparatus 21. FIG. 2C illustrates the first image 22 horizontally displayed by the first electronic apparatus 21.

Therefore, the image display orientation of the image collected by each of the electronic apparatus may be the same as the collection orientation of the image.

When the first electronic apparatus needs to display the first image and the second image simultaneously, the first electronic apparatus may obtain the second image collected by the second electronic apparatus. After receiving the second image, the first electronic apparatus may determine the image display orientation of the second image. Similarly, when the second electronic apparatus needs to display the first image and the second image simultaneously, the second electronic apparatus may obtain the first image collected by the first electronic apparatus. After receiving the first image, the second electronic apparatus may determine the image display orientation of the first image.

After determining the image display orientation of the first image and the image display orientation of the second image, the first electronic apparatus needs to determine consistency between the image display orientation of the second image received by the first electronic apparatus and the image display orientation of the first image. That is, the first electronic apparatus needs to determine whether the image display orientation of the second image is the same as the image display orientation of the first image.

If the image display orientation of the second image is consistent with the image display orientation of the first image, the first electronic apparatus may not need to adjust the image display orientation of the first image or the second image.

If the image display orientation of the second image is not consistent with the image display orientation of the first image, the first electronic apparatus may need to adjust the image display orientation of the second image on the first electronic apparatus. As such, the image display orientation of the second image may be consistent with the image display orientation of the first image. Since the image display orientation of the first image is consistent with the image collection orientation of the first electronic apparatus, the image display orientations of the second image and the first image both are consistent with the image collection orientation of the first electronic apparatus. Similarly, on the second apparatus, the image display orientation of the first image needs to be consistent with the image display orientation of the second image, such that the image display orientations of the first image and the second image are consistent with the image collection orientation of the second electronic apparatus.

FIG. 3A illustrates a first image 32 and a second image 33 simultaneously displayed on a first electronic apparatus 31, when an image collection orientation of the first electronic apparatus 31 is the vertical orientation. If the image display orientation of the second image is not consistent with the image display orientation of the first image, the first electronic apparatus 31 may adjust the image display orientation of the second image 33. As such, the image display orientation of the second image 33 is consistent with the image display orientation of the first image 32, and both image display orientations are the vertical orientation. FIG. 3B illustrates the first image 32 and the second image 33 simultaneously displayed on a first electronic apparatus 31, when the image collection orientation of the first electronic apparatus 31 is the horizontal orientation. If the image display orientation of the second image is not consistent with the image display orientation of the first image, the first electronic apparatus 31 may adjust the image display orientation of the first image. As such, the image display orientation of the first image 32 is consistent with the image display orientation of the second image 33, and both image display orientations are the horizontal orientation.

By causing the image display orientation of the first image to be consistent with the image display orientation of the second image, a problem that a user may simultaneously watch the first image and the second image having the inconsistent image display orientations may be prevented. FIG. 4 illustrates a first electronic apparatus 41, a first image 42, and a second image 43. A positive direction of the first image 42 is upwards, which is consistent with the image collection orientation of the first image collected by the first electronic apparatus. A positive direction of the second image 43 is toward the right, which is the same as the image collection orientation of the second image collected by the second electronic apparatus. If a scene appears as shown in FIG. 4, the user watches the first image and the second image through the first electronic apparatus. Since the image display orientations are inconsistent, user experience is reduced. A solution of the present disclosure makes the image display orientation of the first image to be consistent with the image display orientation of the second image to prevent the situation shown in FIG. 4. The user experience of simultaneously watching the first image and the second image is improved.

In some embodiments, when a video call through the first electronic apparatus and the second electronic apparatus is in progress, each of the first electronic apparatus and the second electronic apparatus may simultaneously display both the first image and the second image. The image display orientation of the second image is consistent with the image display orientation of the first image displayed on the first electronic apparatus. The image display orientation of the first image is consistent with the image display orientation of the second image displayed on the second electronic apparatus. However, the image display orientation of the first image displayed on the first electronic apparatus may be different from the orientation of the first electronic apparatus, or the same as the orientation of the first electronic apparatus. Similarly, the image display orientation of the second image displayed on the second electronic apparatus may be different from the orientation of the second electronic apparatus, or the same as the orientation of the second electronic apparatus. The first electronic apparatus or the second electronic apparatus may be placed vertically or horizontally. The direction of the first electronic apparatus may be the same as or different from the image collection orientation of the first image. The orientation of the second electronic apparatus may be the same as or different from the image collection orientation of the second image.

When the video call is in progress, the orientation of the first electronic apparatus is consistent with the image collection orientation of the first image, and the direction of the second electronic apparatus is consistent with the image collection orientation of the second image.

Further, the processor 72 may be configured to adjust the second image according to the image display orientation of the first image to cause the image display orientation of the second image to be consistent with the image display orientation of the first image displayed on the electronic apparatus. This process may include the following steps.

The processor 72 may be configured to determine that the first electronic apparatus is switched from the first state to the second state and determine whether the state of the second electronic apparatus is changed. When the first electronic apparatus is in the first state, the image display orientation of the first electronic apparatus may be the first orientation. When the first electronic apparatus is in the second state, the imaged display direction of the first electronic apparatus may be the second orientation. If the state of the second electronic apparatus is not changed, the image display orientation of the second image may be adjusted according to the image display orientation of the first electronic apparatus after the state is switched.

During the video call through the first electronic apparatus and the second electronic apparatus, the state of the first electronic apparatus may change, that is, the first electronic apparatus may be switched from the first state to the second state. When the first electronic apparatus is in the first state, the image display orientation of the first electronic apparatus may be the first orientation. When the first electronic apparatus is in the second state, the image display orientation of the first electronic apparatus may be the second orientation. That is, during the video call, when the first electronic apparatus is switched from the first state to the second state, correspondingly, the image display orientation of the first image may be switched from the first orientation to the second orientation.

The first state and the second state may be the placement orientation of an electronic apparatus. When the placement orientation of the electronic apparatus is changed, the image collection orientation of the first image may be changed. Correspondingly, the image display orientation of the first image may be changed.

When the state of the first electronic apparatus is changed, whether the state of the second electronic apparatus is changed may be determined. If the state of the second electronic apparatus is changed, and the second electronic apparatus is also switched from the first state to the second state, the image display orientation of the second image collected by the second electronic apparatus may also be switched from the first orientation to the second orientation. The image display orientation of the first image collected by the first electronic apparatus may be switched to the second orientation as the state of the first electronic apparatus is changed. The image display orientation of the second image may also be switched to the second orientation as the state of the second electronic apparatus is changed. In this case, the image display orientations of the first image and the second image simultaneously displayed on each of the first electronic apparatus and the second electronic apparatus having the changed states may still be the same, that is the second orientation. Therefore, the image display orientation of the second image displayed on the first electronic apparatus may not need to be adjusted individually. Further, the image display orientation of the first image displayed on the second electronic apparatus, may not need to be adjusted individually.

In some embodiments, the state of the first electronic apparatus may be changed, and the state of the second electronic apparatus may not be changed. In other embodiments, even the state of the second apparatus may be changed, which may not be switched from the first state to the second state but switched to another state except the second state. After the state is changed, the state of the first electronic apparatus may be the second state, and the state of the second electronic apparatus maybe another state. Thus, the image display orientation of the first image collected by the first electronic apparatus may be different from the image display orientation of the second image collected by the second electronic apparatus, or the image display orientation of the first image displayed on the first electronic apparatus may be different from the image display orientation of the second image displayed on the first electronic apparatus. In this case, the image display orientation of the second image may need to be adjusted according to the image display orientation of the first electronic apparatus after the state is switched. As such, the image display orientation of the adjusted second image may be the same as the image display orientation of the first image on the first electronic apparatus.

At this point, since the state of the second electronic apparatus is not changed, the image display orientation of the second electronic apparatus may not be changed. Thus, the image display orientation of the second image displayed on the second electronic apparatus may not be changed, and the image display orientation of the first image displayed on the second electronic apparatus may not need to be adjusted. When the video call is started, the image display orientation of the first image may be adjusted, such that the image display orientation of the adjusted first image on the second electronic apparatus is the same as the image display orientation of the second image. The second image with the image display orientation not being adjusted and the second image during the video call may still maintain the same image display direction.

Further, adjusting the image display orientation of the second image according to the image display orientation of the first electronic apparatus after the state is switched may include adjusting the image display orientation of the second image collected by the second electronic apparatus according to the image display orientation of the first electronic apparatus after the state is switched.

In some embodiments, when the first electronic apparatus is switched from the first state to the second state, the image display orientation of the first image collected by the first electronic apparatus is switched from the first orientation to the second orientation. At this point, the second electronic apparatus is notified such that the second electronic apparatus may directly adjust the image collection orientation of the second image to adjust the image collection orientation of the second electronic apparatus to the second orientation. That is, the second electronic apparatus may collect the second image in the second orientation. Thus, the image display orientation of the second image collected by the second apparatus may be the second orientation. After the second electronic apparatus transmits the second image to the first electronic apparatus, the first electronic apparatus may directly receive the second image with the image display orientation as the second orientation. The image display orientation of the second image is consistent with the image display orientation of the first image of the first electronic apparatus. That is, the image display orientation of the second image collected by the second electronic apparatus may be adjusted according to the image display orientation of the first electronic apparatus after the state is switched.

Further, adjusting the image display orientation of the second image according to the image display orientation of the first electronic apparatus after the state is switched may include cutting the second image according to the image display orientation of the second electronic apparatus after the state is switched to cause the image display orientation of the cropped second image to be consistent with the image display orientation of the first image.

In some embodiments, when the first electronic apparatus is switched from the first state to the second state, the image display orientation of the first image collected by the first electronic apparatus may be switched from the first orientation to the second orientation. At this point, the state of the second electronic apparatus may not need to be adjusted, and the image collection orientation of the second image collected by the second electronic apparatus may not need to be adjusted. The second image collected by the second electronic apparatus may be cropped to cause the image display orientation of the cropped second image to be the same as the image display orientation of the first image collected by the first electronic apparatus after the state is switched.

If the first electronic apparatus is switched from the vertical orientation to the horizontal orientation, the image display orientation of the first image collected by the first electronic apparatus may also be switched from the vertical orientation to the horizontal orientation. However, the image display orientation of the second image may be still the vertical orientation. In this case, blank display contents may be added on both sides of the second image in the vertical orientation, such that the second image with the added blank display contents may have a size same as a size of the horizontal orientation. The direction of the second image is then adjusted to the horizontal orientation. If the first electronic apparatus is switched from the horizontal orientation to the vertical orientation, the image display orientation of the first image collected by the first electronic apparatus may be also switched from the horizontal orientation to the vertical orientation. However, the image display orientation of the second image may be still the horizontal orientation. In this case, the second image in a horizontal orientation may be cropped to have a size the same as a size of the vertical orientation. The direction of the cropped second image may be then adjusted to the vertical orientation.

Further, the processor 72 may be configured to adjust the second image according to the image display orientation of the first image to cause the image display orientation of the second image to be consistent with the image display orientation of the first image displayed on the electronic apparatus. The process may include the following steps.

The processor 72 may be configured to determine that the image display orientation of the second image is different from the image display orientation of the first image, notify the second electronic apparatus to collect the second image in the image display orientation of the first image. As such, the imaged display direction of the second image collected by the second electronic apparatus may be consistent with the image display orientation of the first image.

When the video call is established, if the image display orientation of the second image is determined to be different from the image display orientation of the first image, the second electronic apparatus may be notified. As such, the image display orientation may be changed when the second electronic apparatus collects the second image. After the image collection orientation is changed, the image display orientation of the second image collected by the second electronic apparatus may be the same as the image display orientation of the first image collected by the first electronic apparatus. Therefore, the image display orientations of the first image and the second image displayed on the first electronic apparatus, and the image display orientations of the first image and the second image displayed on the second electronic apparatus may be ensured to be the same. The situation may not happen that the first electronic apparatus may display the first image and the second image in the first orientation, and the second electronic apparatus may display the first image and the second image in the second orientation.

Further, the state of the first electronic apparatus may be determined according to the image display orientation of the first image. The image display orientation of the first image may be the same as the state of the first electronic apparatus. The second electronic apparatus may be then notified. Thus, the second electronic apparatus may be adjusted to be the same state as the first electronic apparatus.

When the video call is established, if the image display orientation of the first image collected by the first electronic apparatus is different from the image display orientation of the second image collected by the second electronic apparatus, the state of the first electronic apparatus may be determined according to the image display orientation of the first image. That is, whether the first electronic apparatus is in the first state or the second state may be determined. When the first electronic apparatus is in the first state, the image display orientation of the first image collected by the first electronic apparatus may be the first orientation. When the first electronic apparatus is in the second state, the image display orientation of the first image collected by the first electronic apparatus may be the second orientation.

After the state of the first electronic apparatus is determined, the second electronic apparatus may be notified. As such, the second electronic apparatus may be adjusted to be in the same state as the first electronic apparatus. That is, when the first electronic apparatus is in the first state, the second electronic apparatus is notified. Thus, the second electronic apparatus may be adjusted to be in the first state. As such, the image display orientation of the first image collected by the first electronic apparatus may be ensured to be the same as the image display orientation of the second image collected by the second electronic apparatus. Both image display orientations of the first image and the second image are the first orientation. If the first electronic apparatus is in the second state, the second electronic apparatus may be notified, such that the second electronic apparatus may be adjusted to be in the second state. As such, the image display orientation of the first image collected by the first electronic apparatus may be ensured to be the same as the image display orientation of the second image collected by the second electronic apparatus. Both image display orientations of the first image and the second image are the second orientation.

The electronic apparatus of embodiments of the present disclosure may be configured to determine the image display orientation of the first image collected by the first electronic apparatus, and determine the image display orientation of the second image collected by the second electronic apparatus, received by the first electronic apparatus. The first image and the second image may be displayed simultaneously on the first electronic apparatus. The second image may be adjusted according to the image display orientation of the first image to cause the image display orientation of the second image to be consistent with the image display orientation of the first image displayed on the first electronic apparatus. The present solution may determine the image display orientation of the second image after the image display orientation of the first image is determined. The present solution may adjust the second image according to the image display orientation of the first image to cause the image display orientation of the first image to be consistent with the image display orientation of the second image. As such, the problem that the user may inconveniently watch the first image and the second image with the inconsistent image display orientations simultaneously may be prevented. Thus, the user experience may be improved.

An information processing device of embodiments of the present disclosure may include a first determination unit, a second determination unit, and an adjustment unit. The first determination unit may be configured to determine the image display orientation of the first image collected by the first electronic apparatus. The second determination unit may be configured to image display orientation of the second image collected by the second electronic apparatus and received by the first electronic apparatus. The first image and the second image may be simultaneously displayed on the first electronic apparatus. The adjustment unit may be configured to adjust the second image according to the image display orientation of the first image to cause the image display orientation of the second image to be consistent with the image display orientation of the first image displayed on the first electronic apparatus.

The information processing device of embodiments of the present disclosure is realized according to the information processing method of embodiments of the present disclosure. The specific processing process is not repeated here.

A storage medium of embodiments of the present disclosure may be configured to state at least a group of instructions. The instructions may be used to be called and at least execute any one of the information processing methods described above.

Various embodiments of the present disclosure are described in a progressive manner, and each embodiment focuses on the differences from other embodiments, and the same or similar parts between the various embodiments can be referred to each other. For the device disclosed in embodiments, since the device corresponds to the method disclosed in embodiments, the description is relatively simple, and the relevant information can be referred to the description of the method section.

Those skilled in the art may further realize that the units and algorithm steps of the examples described in connection with embodiments of the present disclosure can be implemented by electronic hardware, computer software, or a combination thereof. To clearly illustrate the interchangeability of hardware and software, in the above description, the composition and steps of each example have been generally described in accordance with the function. Whether these functions are performed by hardware or software depends on the specific application and design constraint conditions of the technical solution. Those skilled in the art can use different methods for each specific application to implement the described functions, but such implementation should not be considered beyond the scope of this application.

The steps of the method or algorithm described in connection with embodiments of the present disclosure may be directly implemented by hardware, a software module executed by a processor, or a combination thereof. The software module may be stored in random access memory (RAM), internal memory, read-only memory (ROM), electrically programmable ROM, electrically erasable programmable ROM, registers, hard disks, removable disks, CD-ROMs, or any other known storage medium in the technical field.

The above-described embodiments may enable those skilled in the art to implement or use the present disclosure. Various modifications to these embodiments may be made by those skilled in the art. The general principles defined in the present disclosure may be implemented in other embodiments without departing from the spirit or scope of the present disclosure. Therefore, the present disclosure will not be limited to the above-described embodiments, but should conform to the widest scope consistent with the principles and novel features disclosed in the present disclosure.

What is claimed is:

1. An information processing method, comprising:
   determining, by a first electronic apparatus, an image display orientation of a first image collected by the first electronic apparatus;
   determining, by a second electronic apparatus, an image display orientation of a second image received by the first electronic apparatus, the second image being collected by the second electronic apparatus;
   determining, by the first electronic apparatus, that the image display orientation of the second image is different from the image display orientation of the first image;
   automatically notifying, by the first electronic apparatus, the second electronic apparatus to collect the second image in the image display orientation of the first image; and
   automatically displaying the second image, by the first electronic apparatus so that the image display orientation of the second image to be consistent with the image display orientation of the first image displayed on the first electronic apparatus.

2. The method of claim 1, further comprising:
   determining whether the image display orientation of the second image received by the first electronic apparatus is consistent with the image display orientation of the first image.

3. The method of claim 1, wherein notifying the second electronic apparatus to collect the second image in the image display orientation of the first image displayed on the first electronic apparatus further includes:
   notifying the second electronic apparatus to collect the image display orientation of the second image according to the image display orientation of the first electronic apparatus after the state is switched; or
   notifying the second electronic apparatus to crop the second image according to an image display orientation of the second electronic apparatus after the state is switched so that the image display orientation of the cropped second image is consistent with the image display orientation of the first image.

4. The method of claim 1, wherein notifying, by the first electronic apparatus, the second electronic apparatus to collect the second image in the image display orientation of the first image the image display orientation further includes:
   determining a state of the first electronic apparatus according to the image display orientation of the first image, the image display orientation of the first image being related to the state of the first electronic apparatus; and
   notifying the second electronic apparatus to adjust a state of the second electronic apparatus to be same as the state of the first electronic apparatus.

5. An electronic apparatus, comprising:
   a display configured to display a first image and a second image simultaneously; and
   a processor of a first electronic apparatus configured to:
      determine an image display orientation of a first image collected by the first electronic apparatus;

receiving a second image and an image display orientation of the second image by the first electronic apparatus, the second image being collected by a second electronic apparatus;

determine that the image display orientation of the second image is different from the image display orientation of the first image;

automatically notify the second electronic apparatus to collect the second image in the image display orientation of the first image; and automatically display the second image so that the image display orientation of the second image to be consistent with the image display orientation of the first image displayed on the first electronic apparatus.

6. The apparatus of claim 5, wherein the processor is further configured to:

determine whether the image display orientation of the second image received by the first electronic apparatus is consistent with the image display orientation of the first image.

7. The apparatus of claim 5, wherein the processor is further configured to:

determine that the first electronic apparatus is switched from a first state to a second state; and determine whether the state of the second electronic apparatus is changed, wherein:

when the first electronic apparatus is in the first state, the image display orientation of the first electronic apparatus is a first orientation; and when the first electronic apparatus is in the second state, the image display orientation of the first electronic apparatus is a second orientation.

8. The apparatus of claim 5, wherein the processor is further configured to:

notify the second electronic apparatus to adjust the image display orientation of the second image collected by the second electronic apparatus according to the image display orientation of the first electronic apparatus after the state is switched; or notify the second electronic apparatus to crop the second image according to an image display orientation of the second electronic apparatus after the state is switched so that the image display orientation of the cropped second image is consistent with the image display orientation of the first image.

9. A non-transitory computer readable storage medium storing instructions that, when executed by a processor of a first electronic apparatus, cause the processor to:

determine an image display orientation of a first image collected by the first electronic apparatus;

receive an image display orientation of a second image received by the first electronic apparatus, the second image being collected by a second electronic apparatus;

determine that the image display orientation of the second image is different from the image display orientation of the first image;

automatically notify the second electronic apparatus to collect the second image in the image display orientation of the first image by the at least one processor; and automatically display the second image so that the image display orientation of the second image to be consistent with the image display orientation of the first image displayed on the first electronic apparatus.

10. The non-transitory computer readable storage medium of claim 9, wherein the instructions further cause the processor to:

determine whether the image display orientation of the second image received by the first electronic apparatus is consistent with the image display orientation of the first image.

11. The non-transitory computer readable storage medium of claim 9, wherein the instructions further cause the processor to:

determine that the first electronic apparatus is switched from a first state to a second state; and determine whether the state of the second electronic apparatus is changed, wherein:

when the first electronic apparatus is in the first state, the image display orientation of the first electronic apparatus is a first orientation; and when the first electronic apparatus is in the second state, the image display orientation of the first electronic apparatus is a second orientation.

12. The non-transitory computer readable storage medium of claim 9, wherein the instructions further cause the processor to:

notify the second electronic apparatus to adjust the image display orientation of the second image collected by the second electronic apparatus according to the image display orientation of the first electronic apparatus after the state is switched; or notify the second electronic apparatus to crop the second image according to an image display orientation of the second electronic apparatus after the state is switched so that the image display orientation of the cropped second image is consistent with the image display orientation of the first image.

* * * * *